(12) United States Patent
Bichot et al.

(10) Patent No.: US 9,609,179 B2
(45) Date of Patent: Mar. 28, 2017

(54) METHODS FOR PROCESSING MULTIMEDIA FLOWS AND CORRESPONDING DEVICES

(75) Inventors: Guillaume Bichot, La Chapelle Chaussee (FR); Anthony Laurent, Vignoc (FR); Yvon Legallais, Rennes (FR)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 13/824,685

(22) PCT Filed: Sep. 22, 2011

(86) PCT No.: PCT/EP2011/066515
§ 371 (c)(1),
(2), (4) Date: Mar. 18, 2013

(87) PCT Pub. No.: WO2012/038506
PCT Pub. Date: Mar. 29, 2012

(65) Prior Publication Data
US 2013/0182181 A1    Jul. 18, 2013

(30) Foreign Application Priority Data
Sep. 22, 2010 (FR) ..................... 10 57600

(51) Int. Cl.
*H04N 5/04* (2006.01)
*H04N 21/235* (2011.01)
(Continued)

(52) U.S. Cl.
CPC ............. *H04N 5/04* (2013.01); *H04N 21/235* (2013.01); *H04N 21/2368* (2013.01);
(Continued)

(58) Field of Classification Search
USPC ................. 348/515, 510, 512, 500, 516–518
See application file for complete search history.

(56) References Cited

U.S. PATENT DOCUMENTS 5,471,576 A * 11/1995 Yee ............................... 715/203
6,188,731 B1    2/2001 Kim
(Continued)

FOREIGN PATENT DOCUMENTS

| AU | 2008101244 | 2/2009 |
| CN | 2304214 U | 1/1999 |

(Continued)

OTHER PUBLICATIONS

Dittman et al., "Combined Video and Audio Watermarking: Embedding Content Information in Multimeda Data", Proceedings of SPIE, vol. 3971, 2000, pp. 455-464.
(Continued)

*Primary Examiner* — Paulos M Natnael
(74) *Attorney, Agent, or Firm* — Tutunjian & Bitetto, P.C.

(57) ABSTRACT

A method for synchronizing of multimedia flows provided by different sources or transmitted via different transport protocols to a single receiving device or are designed to be rendered by different rendering devices. According to the invention, a reference datum representative of a datum of the first multimedia flow is provided in the second multimedia flow and associated with a datum of this second multimedia flow to synchronise the two flows. This reference datum constitutes a timing reference for the datum of the second multimedia flow with which it is associated. It is used to synchronize the two multimedia flows.

20 Claims, 3 Drawing Sheets

Figure 1:
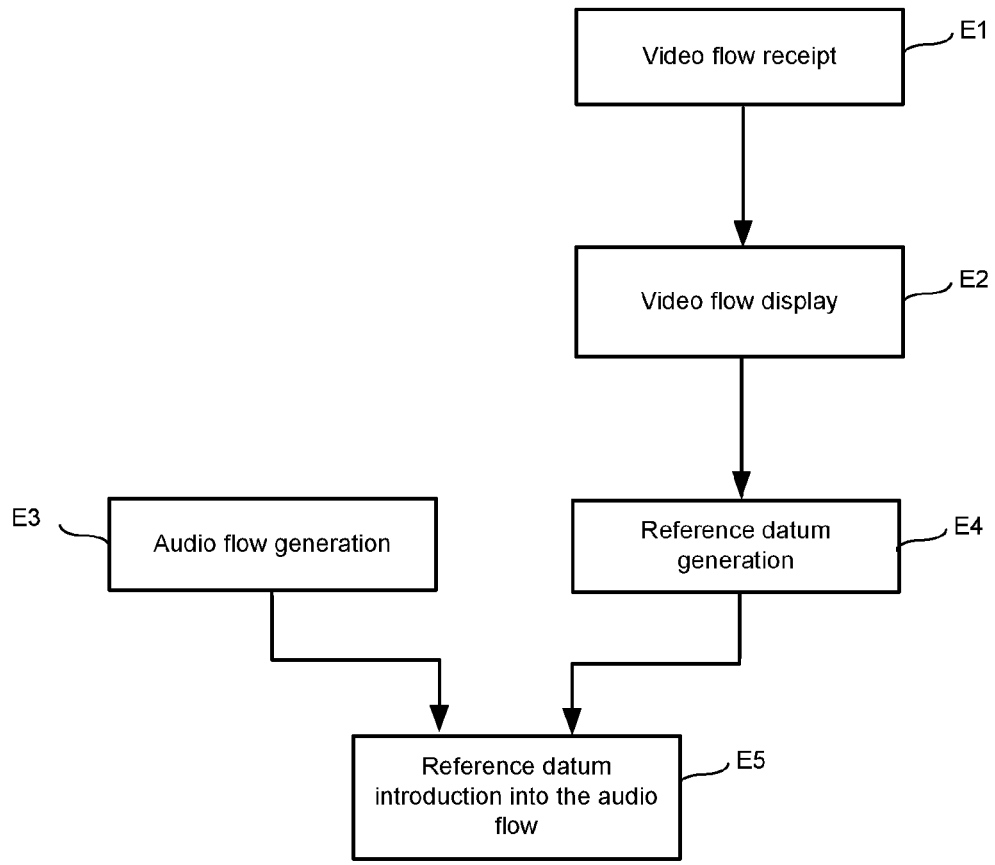

(51) Int. Cl.
*H04N 21/2368* (2011.01)
*H04N 21/242* (2011.01)
*H04N 21/414* (2011.01)
*H04N 21/4223* (2011.01)
*H04N 21/43* (2011.01)
*H04N 21/434* (2011.01)
*H04N 21/435* (2011.01)
*H04N 21/44* (2011.01)
*H04N 21/462* (2011.01)

(52) U.S. Cl.
CPC ..... *H04N 21/242* (2013.01); *H04N 21/41407* (2013.01); *H04N 21/41415* (2013.01); *H04N 21/4223* (2013.01); *H04N 21/4302* (2013.01); *H04N 21/435* (2013.01); *H04N 21/4307* (2013.01); *H04N 21/4341* (2013.01); *H04N 21/44008* (2013.01); *H04N 21/4622* (2013.01)

(56) References Cited

U.S. PATENT DOCUMENTS

| | | | |
|---|---|---|---|
| 6,480,902 B1 | 11/2002 | Yuang et al. | |
| 7,116,894 B1* | 10/2006 | Chatterton | 386/211 |
| 7,206,434 B2* | 4/2007 | Overton et al. | 382/103 |
| 7,268,826 B2* | 9/2007 | Lundblad et al. | 348/515 |
| 7,333,519 B2* | 2/2008 | Sullivan et al. | 370/517 |
| 7,386,180 B2* | 6/2008 | Sota et al. | 382/233 |
| 7,460,173 B2* | 12/2008 | Lundblad et al. | 348/515 |
| 7,907,212 B2* | 3/2011 | Girardeau et al. | 348/515 |
| 8,400,566 B2* | 3/2013 | Terry et al. | 348/515 |
| 2002/0049727 A1* | 4/2002 | Rothkopf | 707/1 |
| 2002/0136157 A1* | 9/2002 | Takaoka et al. | 370/208 |
| 2003/0193616 A1 | 10/2003 | Baker et al. | |
| 2004/0204962 A1 | 10/2004 | Howser et al. | |
| 2005/0193138 A1* | 9/2005 | Kim | 709/231 |
| 2006/0012709 A1 | 1/2006 | Yamada et al. | |
| 2006/0101504 A1 | 5/2006 | Aravamudan et al. | |
| 2006/0274201 A1 | 12/2006 | Lim | |
| 2006/0291478 A1 | 12/2006 | Cutler et al. | |
| 2007/0002902 A1 | 1/2007 | Hannuksela | |
| 2007/0220561 A1 | 9/2007 | Girardeau, Jr. et al. | |
| 2007/0268404 A1 | 11/2007 | Maertens et al. | |
| 2008/0024659 A1* | 1/2008 | Tanaka | H04N 7/088 348/452 |
| 2011/0191816 A1 | 8/2011 | Henry et al. | |
| 2012/0033035 A1* | 2/2012 | Lee et al. | 348/42 |
| 2014/0204962 A1* | 7/2014 | Park et al. | 370/509 |

FOREIGN PATENT DOCUMENTS

| | | |
|---|---|---|
| CN | 101076120 | 11/2007 |
| CN | 101809965 A | 8/2010 |
| EP | 1519263 | 3/2005 |
| EP | 2043323 | 4/2009 |
| GB | 2301265 | 11/1996 |
| JP | 2005515510 T2 | 5/2005 |
| JP | 2005210196 A2 | 8/2005 |
| JP | 2007053604 | 3/2007 |
| JP | 2009100134 A2 | 5/2009 |
| KR | 10 2005 107227 | 11/2005 |
| KR | 1020040032532 | 11/2005 |
| WO | WO0043999 | 7/2000 |
| WO | WO0057647 | 9/2000 |
| WO | WO2005004470 | 1/2005 |
| WO | WO2006101504 | 9/2006 |

OTHER PUBLICATIONS

Search Report Dated Oct. 27, 2011.

* cited by examiner

METHODS FOR PROCESSING MULTIMEDIA FLOWS AND CORRESPONDING DEVICES

This application claims the benefit, under 35 U.S.C. §365 of International Application PCT/EP11/066515, filed Sep. 22, 2011, which was published in accordance with PCT Article 21(2) on Mar. 29, 2012 in English and which claims the benefit of French patent application No. 1057600, filed Sep. 22, 2010.

The present invention relates to the processing of multimedia flows from different multimedia sources or transmitted via different transport protocols and/or restored on different rendering devices.

In broadcast TV, the audio and video flows are traditionally broadcast together. They are generally provided by a single multimedia source, for example a supplier of multimedia contents, then transported by a single transport protocol over a given transport network then delivered to a single end user device, for example a television, in charge of reading these flows, displaying the video data on a screen and broadcasting the audio data on a loudspeaker.

With the rapid development of the Internet network and mobile telecommunication networks new multimedia applications have appeared in which the sources and/or the transport protocols and/or the rendering devices can be different for the audio flows and the video flows. For these new applications, it is necessary to make sure that the rendering of the audio flow is synchronous with the rendering of the video flow.

An example of new multimedia application is the generation of an audio flow by a source different from that of the video flow, this audio flow being intended to substitute itself for a basic audio flow which would be provided with the video flow. For example, in the case of a football match broadcast on the television, it is possible to substitute for the basic audio flow provided with the video flow of the match an audio flow comprising for example comments in a language other than that of the basic audio flow which would be delivered by another multimedia supplier than the match broadcaster. In order that the audio flow can be synchronized with the video flow, the said flows must contain common or equivalent timing references. As a general rule, the transport protocol provides these references or timestamps to the rendering device so that it regulates and synchronizes the rendering of the two flows.

The timestamp is generally a counter value which indicates the time during which the event associated with this timestamp occurs. The clock frequency of the counter must be a value known by the rendering device so that it correctly regulates the flow rendering. The manner in which this clock frequency is given to the rendering device is described in the specifications of the transport layers (MPEG-TS, RTP, etc.).

In order that the rendering device can synchronize the two flows, the latter generally refer to a common clock commonly called "wall clock". For example, in the case of the RTP protocol (for Real Time Transport Protocol), a transmitter periodically transmits a message called transmission report RTCP indicating the equivalence between the timestamp and the time given by the common clock. If the audio and video flows are provided by different sources, these two sources must share the same common clock. The NTP protocol (for Network Time Protocol) is typically used to synchronize the two sources on the same clock.

However, when the two sources are not connected by a sufficiently reliable network in terms of transport time, another synchronization mechanism is then necessary.

This synchronization problem between audio and/or video flows also exists when the rendering of the two flows is performed by different rendering devices, for example when the video flow is rendered by a television and the audio flow is rendered by a personal terminal, like for example a mobile telephone. Indeed, even if the transport protocol provides timestamps to perform the rendering of the audio flow and of the video flow, only the video flow rendering device knows exactly when the video frames are displayed on the screen, this moment being particularly dependent on the storing time and of the decoding time in the device. It is the same for the audio rendering in the user terminal.

This synchronization problem can also exist between two video flows which are displayed on a single rendering device, one of the video contents being displayed by picture in picture in the other one, when the two flows are not provided by the same source or the same transport protocol.

The purpose of the present invention is to propose a solution that aims to overcome the aforementioned disadvantages which makes it possible to synchronize two audio and/or video flows provided by different sources or transmitted via different transport protocols to a single receiving device and/or intended to be rendered by different rendering devices.

For this purpose, the present invention relates to a method for processing multimedia data flows in a receiving device comprising the following steps:
  receive a first multimedia flow comprising audio or video data and a second multimedia flow comprising audio or video data, said second flow containing at least synchronization information,
  synchronize said first and second multimedia flows by using said synchronization information,
  perform a rendering step for said first and second multimedia flows,
  said method being remarkable in that the synchronization information comprises a datum representative of audio or video data of the first multimedia flow, called reference datum, which is associated with audio or video data of the second multimedia flow, and in that, during the synchronization, the first and second multimedia flows are synchronized in such a manner that the rendering of the video or audio data of the second multimedia flow associated with the reference datum and the rendering of the video or audio data of the first multimedia flow corresponding to said reference datum are synchronous.

Hence, according to the invention, a reference datum representative of a datum of the first multimedia flow is provided in the second multimedia flow and associated with a datum of this second multimedia flow to synchronize the two flows. Moreover, the data of the two multimedia flows are synchronized so that their rendering by a display device and/or audio device is synchronous.

According to one particular embodiment, the second multimedia flow is synchronized with respect to the first multimedia flow. The synchronization step comprises a step for comparing the audio or video data of the first multimedia flow with the reference datum of the second multimedia flow to then lock the rendering of the second multimedia flow on that of the first multimedia flow.

This comparison step comprises for example a step for calculating the signal-to-noise ratio between each of the audio or video data of the first multimedia flow and the reference datum.

According to one particular embodiment, the first multimedia flow is a video flow containing video frames, the reference datum introduced into the second multimedia flow is a video frame of the first multimedia flow or a datum derived from said video frame and the second multimedia flow is an audio flow.

According to one particular embodiment, said first and second multimedia flows come from different multimedia sources and/or are provided by different transport networks.

The present invention also relates to a method able to generate the second multimedia flow comprising the reference datum, and more particularly a method for processing multimedia data flows in a transmitting device comprising the following steps:
- receive a first multimedia flow comprising audio or video data,
- perform a rendering step for said first multimedia flow,
- generate a second multimedia flow comprising audio or video data,
- generate at least a datum, known as reference datum, representative of an audio or video datum of the first multimedia flow,
- associate, in said second multimedia flow, said reference datum with the audio or video datum of the second multimedia flow generated at the time of rendering of the audio or video datum of the first multimedia flow corresponding to said reference datum.

The present invention also relates to receiving devices capable of implementing the invention method. At the receiving level, the renderings of the first and second multimedia flows can be performed in a single device, for example a television, or in two distinct devices.

In the first case, according to the invention a device is proposed comprising
- means for receiving a first multimedia flow comprising audio or video data and a second multimedia flow comprising audio or video data, said second flow containing at least synchronization information,
- means for synchronizing said first and second multimedia flows using said synchronization information,
- means for rendering said first and second multimedia flows,
characterized in that the synchronization information comprising a datum representative of an audio or video datum of the first multimedia flow, called reference datum, which is associated with an audio or video datum of the second multimedia flow, the synchronization means synchronize said first and second multimedia flows in such a manner that the rendering of the video or audio datum of the second multimedia flow associated with the reference datum and the rendering of the video or audio datum of the first multimedia flow corresponding to said reference datum are synchronous.

In the second case, according to the invention a device for receiving multimedia flows is proposed comprising
- means for capturing the rendering of a first multimedia flow comprising audio or video data,
- means for receiving a second multimedia flow comprising audio or video data, said second flow containing at least synchronization information,
- means for synchronizing the second multimedia flow by using said synchronization information,
- means for rendering the second multimedia flow,
characterized in that the synchronization information comprising a datum representative of an audio or video datum of the first multimedia flow, called reference datum, which is associated with an audio or video datum of the second multimedia flow, the synchronization means synchronize said first and second multimedia flows in such a manner that the rendering of the video or audio datum of the second multimedia flow associated with the reference datum and the rendering of the video or audio datum of the first multimedia flow corresponding to said reference datum are synchronous.

Figure 2:
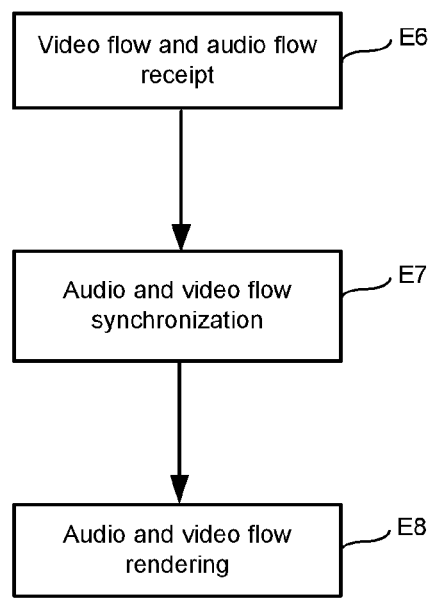
Figure 3:
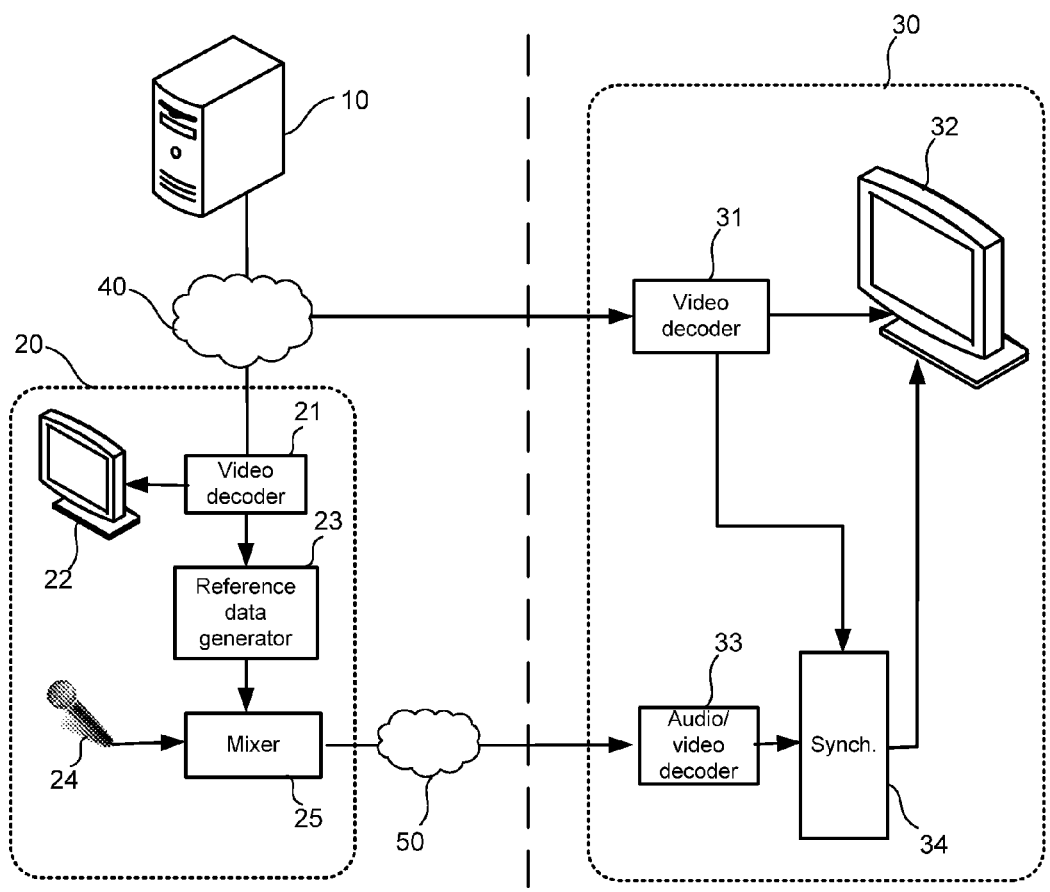
Figure 4:
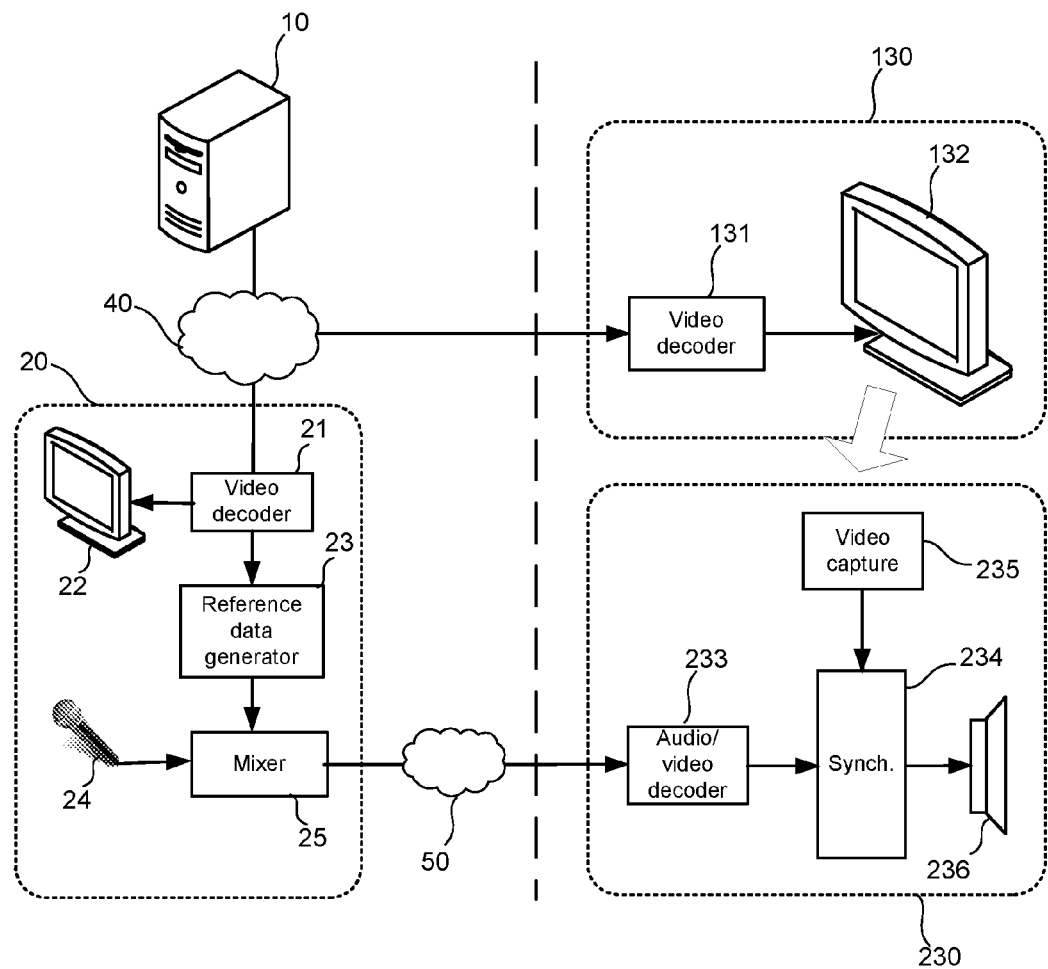

The invention will be better understood, and other aims, details, characteristics and advantages will appear more clearly over the course of the detailed description which follows in referring to the figures in the appendix, showing in:

FIG. 1, a flow chart of the steps of the invention method implemented in a transmitting device, FIG. 2, a flow chart of the steps of the invention method implemented in a receiving device, FIG. 3, a diagram representing the means to implement the invention when the rendering of the first and second multimedia flows is performed in the same device, and FIG. 4, a diagram representing the means to implement the invention when the rendering of the first and second multimedia flows is performed in different devices.

According to the invention, the use of an audio or video datum of a first multimedia flow as timing reference is planned for an audio or video datum of a second multimedia flow with the purpose of synchronizing the rendering of the two flows. These two flows are provided by different multimedia sources or transmitted via different transport protocols to a single receiving device or are designed to be rendered by different rendering devices.

In the present description, a first multimedia flow which is a video flow and a second multimedia flow which is an audio flow are considered. The rendering of a video flow is understood to mean the display of the data or video frames of the video flow on a display device and the rendering of the audio flow is understood to mean the restitution of the audio data (sound) of the audio flow by an audio device such as a loudspeaker or headphones.

For the renderings of the audio flow and of the video flow to be synchronized, a datum representative of a video frame of the video flow, called reference datum, is introduced into the audio flow and associated with the audio flow datum the rendering of which must be synchronized with the rendering of said video frame.

This reference datum can be a video frame of the video flow or a datum derived from this video frame.

The generation of the audio flow containing the reference datum is illustrated by FIG. 1.

According to a step E1, the video flow comprising multiple video frames is received. This video flow can have been transmitted with audio data by default. This video flow is displayed on a display device (E2 step). Moreover, the audio flow to be synchronized with the video flow is generated (E3 step). This audio flow corresponds for example to comments in another language than that of the audio data by default. This audio flow is for example generated by a person commenting on the images of the video flow as they are being displayed. At the same time as the generation of the audio flow, reference data representative of video frames of the audio flow are generated preferably periodically (E4 step). As indicated previously, these reference data are either a video frame of the video flow or a datum derived from this frame, for example a frame corresponding to a low resolution image of the video frame or a signature of said video frame. Each of these reference data is then introduced into the audio flow and associated with the datum of the audio flow generated during the display of the video frame corresponding to the reference datum (E5 step). This audio flow is then transmitted via a transport or communication network to a receiving device.

The process for performing the rendering of the two flows is illustrated by FIG. 2. The two flows are received by one or two receiving devices (E6 step). These two flows are possibly decoded then are synchronized (E7 step). The audio flow is synchronized in order that the audio datum associated with the reference datum is synchronized with the video frame of the audio flow corresponding to the reference datum. This synchronization step comprises for example a step for comparing the video frame of the reference datum with the video frames of the video flow. For each video frame, the PSNR (for Peak Signal to Noise Ratio) is calculated for example. The video frame for which the PSNR value is maximum is the video frame of the reference datum. The audio datum associated with the reference datum must be played (reproduced) when this video frame is displayed.

The calculation of the PSNR expressed in decibels (dB) is for example performed as follows:

$$PSNR = 20\log_{10}\left(\frac{255}{\sqrt{MSE}}\right) \text{ with } MSE = \frac{\sum_{i=0}^{m}\sum_{j=0}^{n}[f(i,j) - F(i,j)]^2}{m \cdot n}$$

where
  m is the number of pixels in a video frame column,
  n is the number of pixels in a video frame line,
  f(i,j) is the value of the pixel of coordinates (i,j) of the video frame of the video flow, and
  F(i,j) is the value of the pixel of coordinates (i,j) of the video frame of the reference datum.

The calculation can be done only on the luminance (Y component) by ignoring the chrominance components U and V.

If the image formats of the reference datum and of the video flow are different, they are resized in order to compare images of the same height and width.

As indicated previously, the method of the invention is useful when the source of the audio flow and the source of the video flow are independent sources, or when the transport protocols of the two flows are different, or when the devices for rendering the audio and video flows are different devices.

Now, we are going to describe the transmitting and receiving devices in two cases: a case in which the sources of the audio and video flows of the multimedia sources are different and a case in which the devices for rendering the two flows are different devices.

1$^{st}$ Case: The Source of the Audio Flow and the Source of the Video Flow are Different This case is illustrated by FIG. 3. The video flow is provided by a video source 10 and the audio flow is provided by an audio source 20. The video flow and the audio flow are transmitted to a receiving device via two transport networks, 40 and 50, respectively. These transport networks can be of different technologies.

The video flow is for example a football match which is broadcast live via a TV broadcast network or the Internet network (network 40) to the receiving device 30. The video source 10 is then represented in the form of a server.

The video flow transmitted by the network 40 is received by a video decoder 31 of the receiving device and, once decoded, displayed on a television 32 which constitutes the device for rendering the video flow.

Moreover, this video flow is transmitted via the network 40 to the audio source 20. As a variant, the audio source can receive this video flow by another means, for example by another broadcast network in which the video flow can come from another server. Moreover, the contents of the video flow can be the same without however being in the same format in terms of size or coding.

The source 20 comprises a video decoder 21 to receive and decode the video flow, a screen 22 to display the video flow, a reference data generator 23 from the decoded video flow, a device for generating the audio flow 24 and a mixer 25 responsible for introducing into the audio flow the reference data provided by the generator 23. The audio flow 24 is generated during the rendering of the video flow on the screen 22.

The audio flow enriched in this way is transmitted via the network 50 to the receiving device 30. The audio flow is received and decoded by an audio/video decoder 33. A synchronization device 34 receives the decoded audio and video flows coming from the 31 and 33 decoders, respectively. The synchronization device compares the video frames with the reference data of the audio flow to synchronize the two flows. The flows synchronized in this way are then provided to the television for display and sound reproduction.

It should be noted that the device 24 generates the audio flow after the display of the video flow by the screen 22. The result is that the generated audio flow can, as soon as it is created, be offset with respect to the video flow. This offset is advantageously compensated in the receiving device 30 by delaying, at the output of the video decoder 31, the video flow transmitted to the television 32.

A typical application of this first case corresponds for example to the broadcasting of audiovisual programs in which the end user can with his receiving terminal substitute the sound track provided with the images for another sound track provided by a web site.

2$^{nd}$ Case: The Devices for Rendering the Audio and Video Flows are Different Devices.

This case is illustrated by FIG. 4. A receiving device 130 is in charge of displaying the video flow provided by the network 4. The device 130 comprises a video decoder 131 and a screen 132 to display the decoded video frames.

A receiving device 230 is in charge of rendering the audio flow generated by the audio source 20 during the rendering of the video flow on screen 22 and provided by the network 50. The device 230 comprises an audio/video decoder 233 to receive and decode the audio flow, a device 235 for capturing the video frames displayed by the screen 232, a synchronization device 234 to compare the captured video frames with the video frames of the reference data and synchronize in this way the audio flow on the displayed video flow and a loudspeaker or headphones 235 to reproduce the sound of the synchronized audio flow.

A possible application of this second case is for example the broadcasting of a film in a public place or at the cinema and the transmission of an improved or customized sound through the mobile telephone network. The viewer can watch the film images by listening to, by means of his mobile phone, the improved or customized sound.

In this case, the capture device 235 is for example the camera of the mobile phone. If the video frames provided by the capture device 235 have a lower resolution than those contained in the reference data, the latter must be, before comparison, converted into the same resolution as the captured video frames.

Likewise, a captured frame may not coincide with a frame of the video flow. The captured frame can be off-centred and/or contain superfluous data like, for example, a part of the screen displaying the video frames. In this case, the video frames contained in the reference data must be trimmed.

One can also plan to only compare the video data of a central area of the frame.

The invention can be applied to synchronize an audio flow and a video flow or synchronize together two video flows (in the case of a PIP (Picture In Picture) application or synchronize together two audio flows.

Although the invention has been described in relation to different particular embodiments, it is obvious that it is in no way restricted and that it comprises all the technical equivalents of the means described together with their combinations if the latter fall within the scope of the invention. In particular, the timing reference data proposed here on the basis of video data can be replaced by extracts of the audio flow.

The invention claimed is:

1. A device for receiving multimedia data flows-comprising:
   a first receiver that receives a first multimedia flow;
   a second receiver that receives a second multimedia flow comprising video data,
   said first multimedia flow comprising at least one first audio datum and/or video datum associated with at least one reference datum comprising a video frame and representative of a second video datum of said-second multimedia flow;
   a synchronizer that synchronizes said first and said second multimedia flows by using said reference datum, said synchronizer synchronizing said first audio datum and/or video datum with a second video datum of said second multimedia flow represented by said reference datum associated with said; and
   a renderer that renders said synchronized first and second multimedia flows.

2. The device according to claim 1, wherein the synchronizing comprises comparing the video data of the second multimedia flow with the video frame comprised in said reference datum.

3. The device according to claim 1, wherein the synchronizer calculates a signal-to-noise ratio between each of the video data of the second multimedia flow and the video frame comprised in said reference datum.

4. The device according to claim 1, wherein said second video datum is a video frame and said video frame comprised in said reference datum is said second video datum or a video frame derived from said second video datum.

5. The device according to claim 4, wherein said video frame derived from said second video datum comprises a frame corresponding to a low resolution image of said second video datum.

6. The device according to claim 1, wherein said first and second multimedia flows come from different multimedia sources and/or are provided by different transport networks.

7. A device for receiving a first multimedia data flow comprising:
   a capture interface that captures the rendering of a second multimedia flow;
   a receiver that receives said first multimedia flow, said first multimedia flow comprising at least one first audio datum and/or video datum associated with at least one reference datum comprising a video frame and representative of a second video datum of said second multimedia flow;
   a synchronizer that synchronizes the first multimedia flow with said second multimedia flow by using said reference datum, said synchronizer synchronizing said at least one first video datum and/or audio datum with a second video datum of said second multimedia flow represented by said reference datum associated with said first datum; and
   a renderer that renders the synchronized first multimedia flow.

8. The device according to claim 7, wherein the synchronizing comprises comparing the video data of the second multimedia flow with the video frame comprised in said reference datum.

9. The device according to claim 7, wherein said second video datum is a video frame and said video frame and said video frame comprised in said reference datum is said second video datum or a video frame derived from said second video datum.

10. The device according to claim 9, wherein said video frame derived from said second video datum is a frame corresponding to a low resolution image of said second video datum.

11. The device according to claim 7, wherein said first and second multimedia flows come from different multimedia sources and/or are provided by different transport networks.

12. A transmitting device for generating a first multimedia data flow, said first multimedia flow comprising at least one first audio datum and/or video datum, said first multimedia flow to be synchronized with a received second multimedia flow comprising video data, the transmitting device comprising:
   a receiver that receives said second multimedia,
   a renderer that renders said second multimedia flow;
   a first generator that generates said first multimedia flow, during said rendering of said second multimedia flow, said first datum being generated at the time of rendering of a second audio or video datum of said second multimedia flow;
   a second generator that generates at least one reference datum comprising a video frame and being representative of said second rendered video datum and with which said first datum must be synchronized;
   an inserter that inserts said reference datum in said first multimedia flow, said inserting comprising introducing said reference datum into said first multimedia flow and associating said reference datum with said first datum; and
   a transmitter that transmits said first generated multimedia flow comprising said inserted reference datum.

13. The device according to claim 12, wherein said second video datum is a video frame and said video frame comprised in said reference datum is said second video datum or a video frame derived from said second video datum.

14. The device according to claim 13, wherein said video frame derived from said second video datum comprises a frame corresponding to a low resolution image of said second video datum.

15. A method for generating a first multimedia data flow in a processing device, said first multimedia flow having at least one first audio and/or video datum, said first multimedia flow being generated during a rendering of a second multimedia flow having video data, the method comprising:
   generating said at least one first audio datum and/or video datum at the time of rendering of a second video datum of said second multimedia flow;
   generating at least one reference datum having a video frame representative of said second rendered video datum, with which said at least one first audio datum and/or video datum must be synchronized; and inserting said at least one reference datum in said first multimedia flow, said inserting comprising introducing said at least one reference datum into said first multimedia flow, and associating said at least one reference datum with said at least one first audio datum and/or video datum, wherein:

said second video datum of said second multimedia flow is a video frame, and said video frame comprised in said at least one reference datum is said second video datum of said second multimedia flow or a video frame derived from said second video datum of said second multimedia flow; and said video frame derived from said second video datum of said second multimedia flow comprises a frame corresponding to a low resolution image of said second video datum of said second multimedia flow.

16. A device for rendering a first multimedia flow having at least one first audio datum and/or video datum associated with at least one reference datum, said at least one reference datum having a video frame representative of a second video datum of a second multimedia flow having video data, said device comprising:

a synchronizer that synchronizes said first and said second multimedia flows by using said at least one reference datum, said synchronizer synchronizing said at least one first audio and/or video datum of said first multimedia flow with a second video datum of said second multimedia flow represented by said video frame of said at least one reference datum associated with said at least one first audio and/or video datum of said first multimedia flow;

a first renderer that renders said synchronized first multimedia flow, a rendering of said at least one first audio datum and/or video datum of said first multimedia flow being synchronous with a rendering of said second video datum of said second multimedia flow; and a converter that converts said video frame comprised in said at least one reference datum into a same resolution as the video data of the second multimedia flow.

17. A method, to be performed in a processing device, for rendering a first multimedia flow having at least one first audio and/or video datum, said method comprising:

synchronizing said at least one first audio datum and/or video datum of said first multimedia flow with a second video datum of a second multimedia flow having video data by using a reference datum of said first multimedia flow, said reference datum being associated with said at least one first audio datum and/or video datum of said first multimedia flow and comprising a video frame representative of said second video datum of said second multimedia flow, wherein the synchronizing comprises comparing the video data of the second multimedia flow with the video frame comprised in the reference datum;

rendering said synchronized first multimedia flow; and converting said video frame comprised in said reference datum into a same resolution as the video data of the rendered second multimedia flow.

18. The method according to claim 17, wherein said second video datum of said second multimedia flow is a video frame, and said video frame of said reference datum is said second video datum of said second multimedia flow or a video frame derived from said second video datum of said second multimedia flow.

19. The method according to claim 18, wherein said video frame derived from said second video datum of said second multimedia flow comprises a frame corresponding to a low resolution image of said second video datum of said second multimedia flow.

20. The method according to claim 17, wherein said first and second multimedia flows come from different multimedia sources and/or are provided by different transport networks.

\* \* \* \* \*